Figure 1:
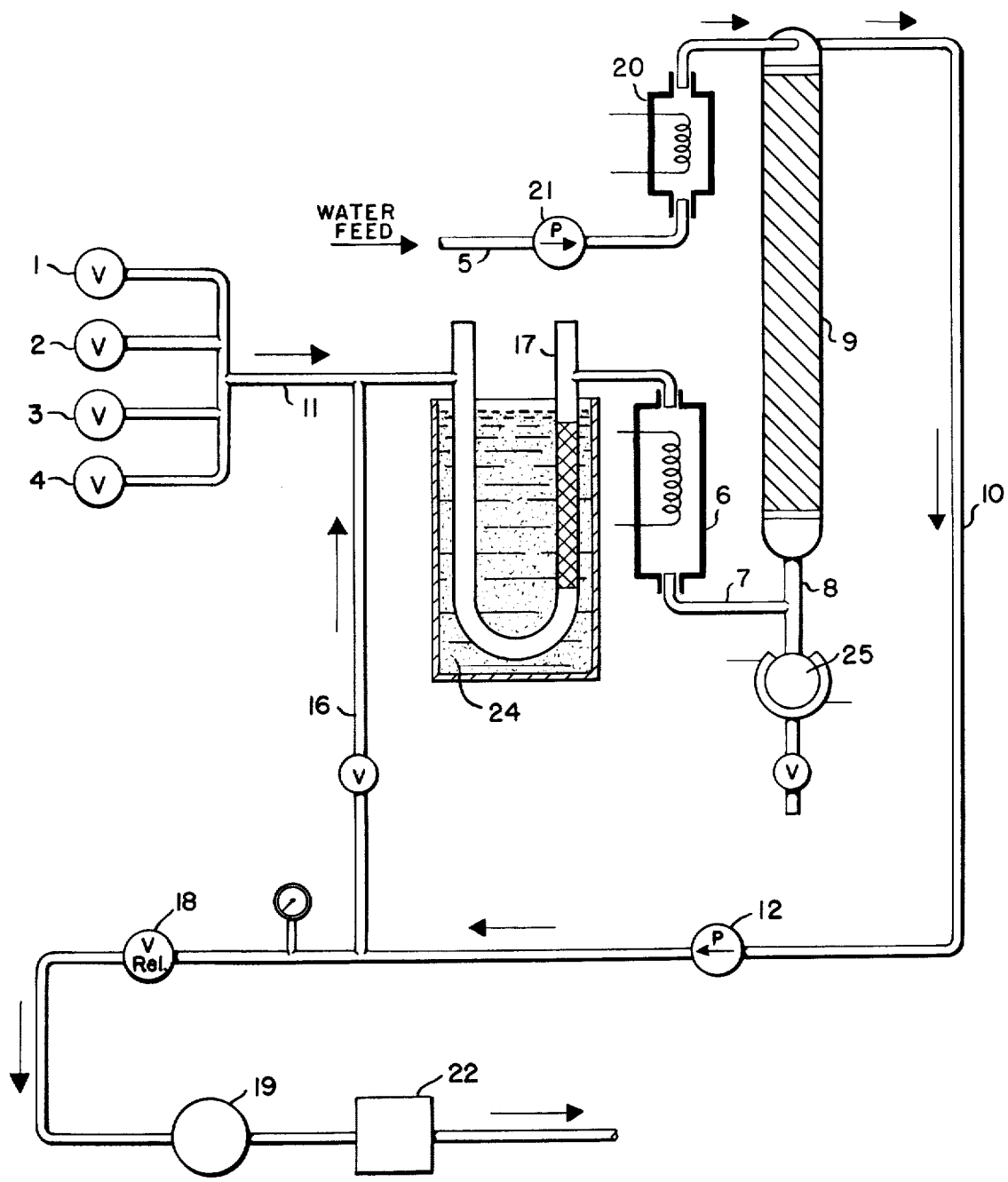

United States Patent [19]

Schlaefer

[11] 3,883,588

[45] May 13, 1975

[54] METHOD OF PREPARING ACRYLIC ACID
[75] Inventor: Francis W. Schlaefer, Pennsauken, N.J.
[73] Assignee: Rohm and Haas Company, Philadelphia, Pa.
[22] Filed: Nov. 9, 1973
[21] Appl. No.: 414,470

Related U.S. Application Data
[63] Continuation-in-part of Ser. No. 124,889, March 16, 1971, abandoned.

[52] U.S. Cl......... 260/533 N; 260/604 R; 260/687; 260/413
[51] Int. Cl...................... C07c 51/32; C07c 57/04
[58] Field of Search...................... 260/533 N, 604

[56] References Cited
UNITED STATES PATENTS
| | | | |
|---|---|---|---|
| 3,527,716 | 9/1970 | Nemec et al. | 260/533 N |
| 3,641,138 | 2/1972 | Ondrey et al. | 260/533 N |
| 3,655,750 | 4/1972 | Ondrey et al. | 260/533 N |

FOREIGN PATENTS OR APPLICATIONS
| | | | |
|---|---|---|---|
| 706,923 | 3/1965 | Canada | 260/604 R |

OTHER PUBLICATIONS
Campbell et al., Ind. Eng. Chem. Prod. Res. Develop., Vol. 9, No. 3 (1970), pp. 325–334.

Primary Examiner—Lorraine A. Weinberger
Assistant Examiner—Richard D. Kelly

[57] ABSTRACT

The present invention relates to the discovery of critical conditions in a method for the preparation of olefinic oxidation products such as unsaturated acids and aldehydes. Use of the critical conditions including the amounts of oxygen, olefin and steam in the feed stream, and control of the contents of the product stream within closely defined limits are essential, and result in high productivity of desired products over a prolonged period of operation, high selectivity over a prolonged period of operation and prolonged life of the oxidation catalyst systems. The invention is preferably employed in the preparation of unsaturated aliphatic acids such as acrylic and methacrylic acids and unsaturated aldehydes such as acrolein and methacrolein by the oxidation of the appropriate olefin over a particulate fixed bed metal oxide catalyst.

5 Claims, 2 Drawing Figures

METHOD OF PREPARING ACRYLIC ACID

This application is a continuation-in-part of application Ser. No. 124,889, filed Mar. 16, 1971, now abandoned.

The invention relates to the preparation of unsaturated carboxylic acids and unsaturated aldehydes by the oxidation of an olefin under highly critical conditions. Acrolein and acrylic acid are prepared by the oxidation of propylene. Methacrolein and methacrylic acid are prepared by the oxidation of isobutylene. The aldehydes are recycled to the reactor.

Many attempts and many catalyst systems have been employed by the art to achieve conversion of propylene to acrolein, acrylic acid and acetic acid. The art indicates that the aforementioned conversion requires high temperatures and large volumes of gases. These conditions foster substantial costs in the construction and maintenance of reactors. Accordingly, for maximum commercial utility, it is imperative that productivity be maintained at a high level. Various degrees of success have been achieved by prior art systems by resorting to the use of high oxygen-propylene ratios, high reactor temperatures and various combinations of promoters and catalysts. The high ratios and temperatures favorably affect productivity per reactor volume but lead to increased waste gas formation. Also, promoters tend to be volatile and toxic, thereby requiring additional equipment for control and reuse. By and large, the known processes present the possibility and actual realization of increased waste gas formation, toxicity problems from the use of volatile promoters, expensive reactor construction and inefficient operation due to catalyst deterioration.

In such vapor phase oxidations of olefins to acids in one step using cobalt molybdate-containing catalysts, it has now been found that catalyst activity is maintained over long periods of time only if the many dependent variables of the feed stream and the product stream are kept within closely defined limits as to composition throughout the continuous run, and that operating conditions must be regulated to maintain the required make-up of the compositions. Also, it has been found that the oxygen level in the reactor effluent must be maintained above a certain critical level in order to retain catalyst activity and selectivity. It has also been found that it is important to maintain this oxygen level while bringing the catalyst up to reaction temperature and, after terminating the run, to maintain this oxygen level while the reactor is cooling.

The objects and advantages of the highly critical conditions are as follows:

1. High productivity over a prolonged period

The examples following this section demonstrate that the acrylic acid productivity using the conditions of the present invention is substantially higher than that obtained with other conditions. Furthermore, this high productivity is maintained even after extended periods of operation. This stability of production is particularly important in commercial operations where decreases in the acid content of the stream substantially reduce the efficiency of the equipment used to isolate the acids.

2. High selectivity over a prolonged period

By employing the conditions of the present invention, one can increase acrylic acid productivity without being burdened by an increased rate of over-oxidation. This not only results in efficient use of the propylene, but also reduces the substantial heat load caused by the production of waste gas and acetic acid. This results in more efficient reactor utilization and also produces a higher concentration of desired acids in the reactor effluent. This enables the subsequent isolation of the acids to proceed with maximum efficiency.

3. Prolonged physical stability and activity

In the field of catalysis, physical stability normally refers to the ability of a catalyst to withstand pressure and abrasion. Such are encountered in heterogeneous catalytic reactors and cause less stable catalysts to crumble into smaller particles or fines. The occurrence of the latter is particularly undesirable in that they restrict gas flow through the reactor. Ultimately, a point is reached where the pressure drop is appreciable and flow becomes nearly impossible. The catalyst must then be replaced. Loss of activity also requires catalyst replacement. Since commercial reactors normally contain a plurality of small diameter tubes, frequently several thousand or more, catalyst replacement is exceedingly time-consuming. In addition to the lack of productivity during shutdown, one must also bear the economic burden of synthesizing and charging fresh catalyst more frequently.

The present invention comprises a process whereby oxygen, olefins such as propylene, and, if produced, by-product aldehydes such as acrolein, are continuously reacted to produce acrylic acid. The invention is particularly concerned with operating said process so that the reactant stream is maintained within a certain, predefined composition range. The process includes a reactor and a unit which serves to scrub the acids from the stream. The acid-free effluent gas, containing the acrolein by-product, if present, is preferably recycled back to the reactor. Fresh propylene and oxygen are added immediately before the recycle stream enters the reactor preheater.

To maintain catalyst activity over extended periods, the residual oxygen, that is the oxygen level at the reactor outlet, after water extraction of the reactor effluent, must be held at or above 1.5 percent. The residual propylene level is not critical but the inlet level is and this must be held below 20 percent. The steam level at the inlet is also critical and must be held above 15 percent. The percentages are on a molar basis. The propylene and oxygen levels are controlled by judicious manipulation of the fresh feeds while the steam level may be conveniently controlled by regulation of the scrubber outlet temperature. Those skilled in the art, however, will recognize that still other methods can be employed to maintain the steam concentration at the desired level.

Compliance with the foregoing is necessary during all pre and post reaction equilibration periods whether or not olefin is present. This final requirement is surprising in view of the prior art, which shows bringing the reactor to reaction temperature before starting the feed and shutting off the flow of all gases before cooling the reactor, but the data in the succeeding examples clearly indicate that this is necessary.

The apparatus in which the process of the invention is operated is shown in FIG. 1. Here the hot reactor effluent containing acrylic acid, acetic acid, acrolein, formaldehyde, carbon dioxide, carbon monoxide, nitrogen and unreacted propylene and oxygen leave the reactor 17 and enter a steam traced heat exchanger 6 where it is cooled to and maintained at a minimum of 100° C. Immediately upon exiting heat exchanger, the gas stream enters an electrically heated transfer pipe 7 which makes it possible to control the temperature at delivery nozzle 8 located in the base of the scrubber column 9. This gradual cooling of the stream results in the precision temperature control which is necessary for the successful operation of the scrubber column.

Upon entering the scrubber column 9 and for the duration of its residence in this ceramic-packed column, the gas is met by a continuous, countercurrent stream of deionized water. This water is fed into the system at 5, its rate controlled by a piston pump 21. Its temperature is maintained by an electrically heated and controlled heat exchanger 20. This water efficiently washes from the reactor effluent stream the following products: acrylic acid, acetic acid and formaldehyde. These products are collected in product receiver 25.

The remaining carbon dioxide, carbon monoxide, nitrogen, acrolein, propylene, and oxygen leave the scrubber saturated with water vapor in an amount proportionate to the scrubber temperature. Thus, the scrubber head temperature controls the steam feed to the reactor. The stream must contain at least 15 percent steam at the reactor inlet. This stream hereinafter referred to as the recycle stream, is conducted through 10 to the flow controlling branch of the system. A positive-displacement diaphragm pump 12 is employed to propel the recycle stream.

The bulk of the recycle stream is transferred through pipe 16 until it meets the reactor feed pipe 11. At this point the stream is replenished with fresh oxygen 1, propylene 2, oxygen and carbon dioxide and/or air 3, and steam 4, and this mixture then enters the reactor 17 where it encounters the fixed bed of catalyst and renews the cycle. Alternatively, all of the acrolein is discharged from the system and recovered or separately oxidized. During start-up and shut-down, air or another gas containing oxygen is fed through the system.

The concentrations of oxygen and propylene at the reactor inlet must be controlled, not only to effect maximum productivity, but also to ensure maximum catalyst life. Rapid intelligence of the gas stream to effect this control is provided by the analysis system in FIG. 1. Because of the manufacture of carbon monoxide and dioxide, the system must be vented constantly to maintain a constant system pressure. This vent stream then provides the feed for the analytical system. The vent valve 18, which is opened by the system pressure when it exceeds a predetermined set point, is located after the orifice but before the fresh feeds are added. The volume of the vent stream is measured at 19. The stream is then analyzed using a gas partitioner 22 and the mole percentages of the various constituents calculated. At no time should the vent stream oxygen level be allowed to drop below 1.5 percent. Similarly, the propylene should be held below 20 percent.

Composition of the reactant stream at the inlet 11 can be calculated from a knowledge of the fresh feeds and the vent stream composition. Here the propylene must be held below 20 percent while the oxygen must be kept above 1.5 percent.

A suitable cobalt-molybdate-containing catalyst is the one shown in our application Ser. No. 615,880, now U.S. Pat. No. 3,527,716, or in our application Ser. No. 783,641.

As described in said patent, one may incorporate, by fluxing, the calcined cobalt molybdate with one or more of the tellurides of arsenic, bismuth and antimony, which may be represented by the formulas: $As_2Te_3$, $Bi_2Te_3$ and $Sb_2Te_3$, respectively. Usually, one would employ one of these tellurides in any particular catalyst system but it is quite possible to react mixtures of two or all three of these tellurides with the cobalt molybdate, as described hereinafter. The tellurides are employed in such a particle size that 75 percent is in the mesh range of 80 or greater. It is desirable to employ at least 90 percent of the telluride in the mesh range of 80 or greater and most advantageous to have all of the telluride in the mesh range of 80 or greater. The preferred telluride is that of bismuth. Fluxing is conducted at a temperature of between 420° C. and 600° C.

The catalyst system may be used, as described hereinbefore, either promoted or not. If a promoted catalyst system is contemplated, it is preferred to use copper telluride, $Cu_2Te$, as the promoter.

The copper telluride promoter, if employed, is used in the range of about 0.10 to about 5.0 percent, preferably about 0.10 to about 1.0 percent, based on the weight of the unpromoted catalyst system. The copper telluride is employed in comminuted form of such a particle size that substantially all of it passes through an 80 mesh screen. The copper telluride is normally mixed with the unpromoted catalyst system by any standard mixing procedure, such as tumbling or the like, and is readily adsorbed. The promotion step, if used, follows the fluxing step, described hereinbefore.

Any other known catalyst for use in oxidizing propylene to acrylic acid and which contains cobalt molybdate in a major proportion is useful in accordance with the invention.

If desired, the catalyst system of this invention may be deposited on a support such as crushed perlite, a superior support, silica, clay, quartz, zirconia, alumina or Carborundum by employing standard techniques known in the art.

The catalyst system may be used to prepare various oxidation products of olefins such as unsaturated aldehydes and unsaturated acids. Representative olefins which may be used in the practice of this invention include propylene, butene-1, isobutylene, pentene-1, hexene-1, and octene-1. The catalyst system of this invention is more effective when the olefin is selected from the lower members of the aforementioned olefin series and is particularly efficient when the olefin is propylene or isobutylene, especially propylene.

Preferably the catalyst system is employed in the oxidative preparation of acrylic acid by the reaction of propylene, oxygen and water. This invention is conducted in a temperature range of about 350° C. to about 500° C. and the preferred range is from 400° C. to about 460° C. Atmospheric pressure or pressures somewhat above atmospheric, such as about 1 to about 40 atmospheres, may be used. Usually atmospheric pressure is employed.

Oxygen may be used as such in the reaction or may be supplied as air. It is desirable in this reaction to employ a diluent to facilitate control of this highly exothermic reaction. Therefore, if oxygen is employed as such, it is preferred to employ a gaseous diluent, such as carbon dioxide, nitrogen or the like. The carbon dioxide diluent is most economically provided from the carbon dioxide produced in the process. If oxygen is employed as the normal approximately 20 percent component of air, then nitrogen is already present as a useful diluent. Generally, the use of oxygen as a component of air is quite satisfactory for the purposes of this reaction.

The propylene is employed in a ratio with respect to oxygen of 1:0.2 to 1:2, preferably 1:0.8 to 1:1.2.

The ratio of water to propylene is about 1:1 to 10:1, preferably about 2:1 to 6:1. The contact time can range from 20 seconds to as low as 0.1 second, but about 0.5 to about 5 seconds is preferred. Longer contact times generally produce higher propylene conversions, but this is accompanied by an increase in waste gas formation. One skilled in the art may balance these two factors to obtain the contact time which results in the most economical operations.

As stated above, the oxygen level in the feed must be such as to result in an effluent from the reactor, after water extraction of the reactor effluent, which contains at least 1.5 percent of oxygen. The upper level of oxygen, as a practical matter, is such that about 20 percent of oxygen is used in the feed. As to olefins such as propylene in the feed, it ranges from about 5 percent to an absolute maximum of 20 percent. Water vapor in the feed is an absolute minimum of 15 percent and may range up to about 60 percent.

The criticality of the amount of oxygen at the minimum of 1.5 percent is surprising, because heretofore it has been found that, when using bismuth phosomolybdate or bismuth molybdate to produce unsaturated aldehydes from olefins, for example, acrolein from propylene, the reactor effluent may comprise as little as about 0.1 mole percent of oxygen. This level is absolutely intolerable when utilizing a cobalt molybdate-containing catalyst in the oxidation of olefins to acids, for example, propylene to acrylic acid. That an oxygen level only as low as 1 percent oxygen in the effluent from the acrylic acid producing reactor, after scrubbing with water, is intolerable, according to the present invention, is clearly shown by Example 3.

Although the most preferred use of the invention is for the oxidation of propylene to acrylic acid, isobutylene may be oxidized to methacrylic acid using the above described reaction parameters for the conversion of propylene to acrylic acid. However, the most effective temperature range for the methacrylic acid reaction is about 360° C. to about 420° C.

Propylene may be oxidized to acrolein by using propylene, oxygen and water and following the reaction parameters for producing acrylic acid from propylene except that a lower temperature range is desirable for efficient operation. Preferably a temperature range of from about 350° C. to about 400° C. is employed. Likewise isobutylene may be converted to methacrolein by employing the reaction parameters of the isobutylene to methacrylic acid conversion but using a lower temperature range, preferably 325° to 375° C.

To assist those skilled in the art to practice the present invention, the following modes of operation are suggested by way of illustration, ratios and percentages being by weight and the temperatures in °C. unless otherwise specifically noted.

An aqueous solution, prepared by dissolving 592 grams of cobaltous nitrate hexahydrate in 700 ml. of deionized water, previously warmed to 60° C., was added to another solution which was prepared from 354 grams of ammonium heptamolybdate and 500 ml. of deionized water, previously warmed to 75° C. The resulting solution was agitated and maintained at 48° to 50° C., while 320 ml. of aqueous 15 percent ammonia was added, dropwise, over a 30-minute period. After agitating for another 15 minutes, the slurry was suction filtered and the precipitate washed on the funnel with five 1-liter portions of deionized water. The filter cake was then allowed to stand under 1 liter of deionized water for 72 hours. After removing the remaining water by filtration, the filter cake was reslurried with 1 liter of deionized water for 1 hour and filtered again. This filter cake was calcined for 32 hours in an electrically heated tube at 560° to 650° C., preferably at 610° to 630° C. in the presence of a 6 liter per minute air stream.

The cobalt molybdate so obtained was crushed to 10/20 mesh. A paste containing 300 parts of the cobalt molybdate and 1.67 parts of bismuth telluride is formed, shaped into pellets, dried, and fluxed at a temperature of 470° to 490° C.

A more detailed commentary on the criticality of the feed and effluent gas compositions is provided in the following examples.

EXAMPLE 1

High and Constant Productivity Over Extended Periods

A. The reactor described above was charged with 93 ml. of three-sixteenths inch cobalt molybdate-bismuth telluride extrusions synthesized in a manner described in U.S. Pat. No. 3,527,716 and immediately above. The reactor was then placed in a bath comprised of molten sodium nitrate and potassium nitrate.

Before introduction of the propylene and oxygen feedstocks, the recycle pump was started and a stream of air was fed to the system. This equilibration gas was circulated through the system while the various transfer lines were heated to their operating temperatures. The acid scrubber was also heated and when the outlet temperature had reached 75° C., propylene at the rate of 80 cc./min. and oxygen at the rate of 164 cc./min. were introduced. The vent stream was then analyzed continuously. When the vent composition had reached a steady state, it contained 7 percent propylene and 3 percent oxygen, well within the aforementioned limits. At the inlet, the stream contained 9 percent propylene, 8 percent oxygen and 35 percent steam, a composition well within the critical limits. This stream was recycled at the rate of 2.8 1./min., corresponding to a contact time of 1.8 seconds. This contact time was also employed for all succeeding examples.

The system was operated continuously at the steady state conditions described above, with the temperature of the salt bath being varied to maintain a maximum catalyst bed temperature of 420° C.

Analysis of the scrubber bottoms collected during this time showed yields of acrylic acid, acetic acid and formaldehyde, based on the propylene fed, of 49, 11 and 3.0 percent respectively. The per pass propylene conversion and catalyst productivity were 28 percent and 4.6 pounds acrylic acid/hour/ft.$^3$ catalyst.

At the end of the run, the feeds were terminated and again the equilibration gas, air, was fed to the system. The heaters on the scrubber were switched off but the water feed to the scrubber was continued. However, its temperature was lowered to 30° C. After the scrubber outlet reached 30° C., the recycle pump was switched off and the air and water feeds terminated.

B. Subsequent to the completion of Example 1-A, several other runs were made. Air was employed as the equilibration gas in many runs but in others a mixture comprising 7 percent oxygen and 93 percent carbon dioxide was used. The reactant compositions were also varied. Thus, propylene concentrations at the inlet ranged from 8 to 12 percent while the steam levels at the inlet ranged from 21 to 35 percent. The oxygen level at the vent was as low as 1.7 and as high as 5.3 percent. All post and pre reactor equilibrations were conducted with streams that gave at least 1.5 percent oxygen in the reactor effluent. During the aforementioned period, the catalyst, originally charged in Example 1, was used in acrylic acid production for over 100 hours.

After this period catalytic productivity was reexamined by returning to the conditions used in Example 1-A. Thus, the fresh propylene and oxygen feeds, water concentration at the inlet and reactor temperature were all similar to those of Example 1-A. After 3 hours at a steady state, the scrubber bottoms were analyzed. The yields of acrylic acid, acetic acid and formaldehyde were 49, 11 and 3.5 respectively. Gas analysis showed a per pass propylene conversion of 31 percent. The productivity was 4.6 pounds acrylic acid/hour/ft.$^3$ catalyst.

Examples 1-A and 1-B clearly indicate that the present invention results in a high and constant productivity when the steam, oxygen and propylene levels in the feed and the effluent level of oxygen at all times are held within the prescribed ranges.

EXAMPLE 2

A. The reactor was charged with 93 ml. of a fresh catalyst similar to that described in Example 1. The reactor was placed in the molten salt bath and the recycle pump started. The system was fed an equilibration gas consisting of 15 percent oxygen and 85 percent carbon dioxide. After the scrubber exit reached 75° C., the equilibration gas was terminated and the propylene and oxygen flows at 95 and 211 cc./min. respectively begun. The reactor temperature was held at 440°C. After a steady state had been reached, the reactor inlet stream was found to contain 7.7 percent oxygen, 6.7 percent propylene and 32 percent water while the residual or vent oxygen level was 1.5 percent. The yields of acrylic acid, acetic acid and formaldehyde were 41, 8 and 3 percent respectively while the propylene conversion and acrylic acid productivity were 44 percent and 4.6 pounds acrylic acid/hour/ft.$^3$ catalyst.

The process was then shut down in a manner similar to that described in 1-A but carbon dioxide (100 percent) was substituted for the air.

B. The catalyst used in Example 1-A was also employed here. The start-up procedure was also identical with the exception of the equilibration gas which comprised 100 percent carbon dioxide. The propylene and oxygen feeds and the reactor temperature were also similar to those employed in 1-A. After a steady state had been reached, the inlet stream contained 8.5 percent propylene, 8.3 percent oxygen and 33 percent water. The oxygen content of the vent was 2.0 percent. The propylene conversion and catalyst productivity fell to 34 percent and 3.8 pounds acrylic acid/hour/ft.$^3$ catalyst respectively. The yields of acrylic acid, acetic acid and formaldehyde were 34, 8.6 and 3.5 percent respectively.

C. The catalyst, pre-run equilibration, feedstream and reactor temperature were all similar to those of Example 2-B. The propylene, oxygen and steam levels at the inlet were 8.2, 8.9 and 33 percent respectively while the residual oxygen was 2.6 percent. The yields of acrylic acid, acetic acid and formaldehyde were 29, 7.2 and 2.9 percent respectively. The propylene conversion and productivity were 36 percent and 3.2 pounds acrylic acid/hour/ft.$^3$ catalyst respectively.

EXAMPLE 3

Necessity of Maintaining Residual Oxygen at or Above the 1.5 Percent Level

A. This study employed a catalyst charge similar to that of Example 1-A. The system was equilibrated with a gas comprising 15 percent oxygen and 85 percent carbon dioxide and then run continuously without shutdown for a period of 17 hours. The reactor temperature and water level at the inlet were held constant at 430° and 33 percent respectively. The propylene and oxygen feeds were constantly changed to maintain 5 percent propylene at the inlet and 1 percent oxygen at the vent. During the course of this extended run, the acrylic acid productivity was measured at various intervals. The relationship of the latter to time on stream under these conditions is presented in FIG. 2.

Figure 2:
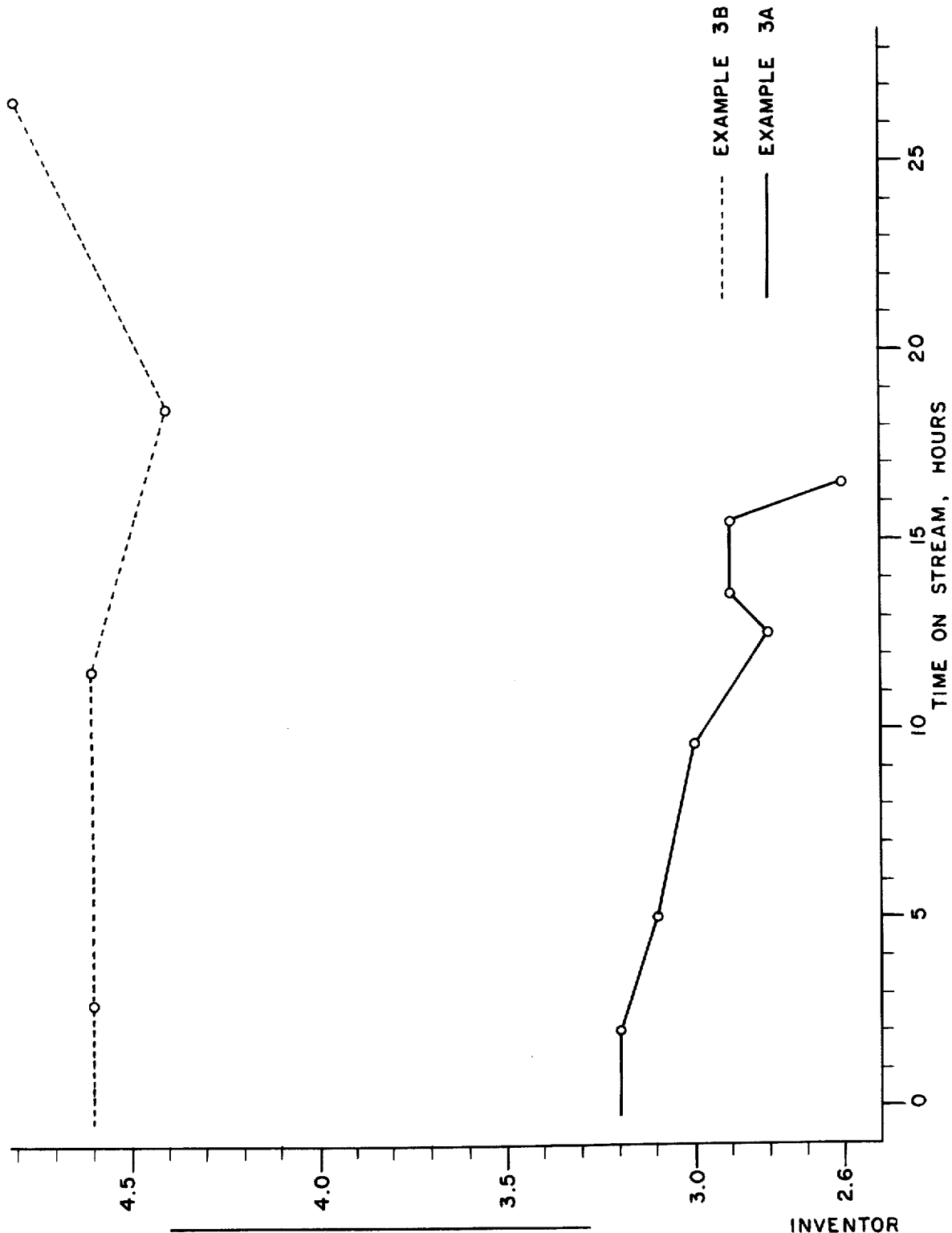

B. A similar study was conducted with a fresh catalyst. Here the reactor temperature and water level at the inlet were also held at 440° and 21 percent respectively. The propylene and oxygen feeds were set to produce 7.6 percent propylene at the inlet and 4.5 percent oxygen at the vent. The productivity time on stream data are also shown in FIG. 2.

EXAMPLE 4

Detrimental Effect of High Propylene Levels

A. The catalyst charge and start-up procedure were similar to Example 1-A, but the equilibration gas comprised a mixture of 7.5 percent oxygen and 92.5 percent carbon dioxide instead of the air of Example 1-A. After the scrubber exit reached 64°, the propylene and oxygen feeds at rates of 80 and 181 cc./min. respectively were begun. After a steady state was reached, analysis of the inlet indicated the presence of 7.6 percent propylene, 10 percent oxygen and 21 percent water. The vent analysis showed 5.1 percent oxygen. After operation under these conditions for 3 hours, the yields of acrylic acid, acetic acid and formaldehyde were 51, 8.9 and 4.2 percent respectively. The propylene conversion and acrylic acid productivity were 33 and 4.8 pounds acrylic acid/hour/ft.$^3$ catalyst respectively.

B. After the scrubber bottoms were drained in Example 4-A, the propylene feed was increased from 80 to 130 cc./min. After a steady state had been reached, the inlet was found to contain 26 percent propylene, 8.5 percent oxygen and 21 percent water. The oxygen level at the vent was 3.3 percent. These conditions resulted in acrylic acid, acetic acid and formaldehyde yields of 20, 6.4 and 2.8 percent respectively. The propylene conversion and catalyst productivity fell to 16 percent and 3.1 pounds acrylic acid/hour/ft.$^3$ catalyst respectively. The system was then shut down in a manner described in Example 1-A. The equilibration gas, however, comprised 7.5 percent oxygen and 92.5 percent carbon dioxide.

C. An equilibrium gas mixture consisting of 7.5 percent oxygen and 92.5 percent carbon dioxide was passed over the bed employed for 4-A and 4-B while the scrubber was heated to a 64° outlet temperature.

To determine if the high propylene level in 4-B did indeed deactivate the catalyst, an attempt was made to duplicate experiment 4-A by employing similar feeds and reactor temperatures. After a steady state was reached, the inlet contained 9.3 percent propylene, 7.7 percent oxygen and 22 percent water. The oxygen percentage at the vent was 2.3. Analysis of the scrubber bottoms indicated that the acrylic acid yield had dropped to 45 percent while the yields of acetic acid and formaldehyde were 8.6 and 2.9 percent respectively. The propylene conversion was 27 percent while the acrylic acid productivity dropped to 4.2 pounds acrylic acid/hour/ft.³ catalyst.

EXAMPLE 5

Other Illustrations of the Present Invention

A. Use of Commercial Grade Propylene

A catalyst bed similar to that described in 1-A was charged to the reactor. The scrubber outlet was heated to 74° C. while an equilibration gas comprising 85 percent carbon dioxide and 15 percent oxygen was fed to the system. The equilibration gas flow was terminated and the propylene and oxygen flows begun at the rate of 85 and 181 cc./min. respectively. The propylene feedstock was a commercial grade containing 92 percent propylene with the balance being mainly propane. The reactor temperature was held at 440° C. and when a steady state was obtained the stream at the inlet was found to contain 4.5 percent propylene, 7.7 percent oxygen, 33 percent water and 3 percent propane. The yields of acrylic acid, acetic acid and formaldehyde were 54, 7.7 and 3.6 percent respectively. The propylene conversion and catalyst productivity were 58 percent and 5.0 pounds acrylic acid/hour/ft.³ catalyst respectively.

B. Reasonably High Propylene and Oxygen Levels at the Reactor Inlet

The catalyst, start-up procedure and propylene feedstock were all similar to that of Example 5-A. The propylene and oxygen feeds were 149 and 279 cc./min. respectively while the reactor temperature was 442°. After reaching a steady state, the propylene, oxygen, water and propane levels at the inlet were 13, 11, 34 and 4 percent respectively. The product yields were 41 percent acrylic acid, 11 percent acetic acid and 2.5 percent formaldehyde while the productivity and propylene conversion were 6.6 pounds acrylic acid/hour/ft.³ catalyst and 34 percent respectively.

C. Low Reactor Temperatures, High Steam Levels, Arsenic Telluride Fluxed Catalyst, ⅛ inch Pellets This catalyst was also synthesized as above, but the fluxing agent was arsenic telluride and the thick paste was formed into ⅛ × ⅛ inch pellets prior to the tempering stage. The reactor was charged with 61 ml. of the foregoing and immersed in the salt bath and while feeding air through the reactor it was brought up to temperature. The propylene and oxygen feeds were set at 80 and 172 cc./min. respectively and after a steady state was reached the reactor temperature was 387° while the feed contained 13 percent propylene, 21 percent oxygen and 42 percent water. The yields of acrylic acid, acetic acid and formaldehyde were 18, 7.5 and 3.0 percent respectively while the propylene conversion and productivity were 20 percent and 2.6 pounds acrylic acid/hour/ft.³ catalyst respectively.

D. High Reactor Temperature

The catalyst and start-up procedure were both similar to those employed in 1-A. The propylene and oxygen feeds were 100 and 208 cc./min. respectively while the reactor termperature was raised to 453° C. After a steady state had been reached the gas stream at the inlet was found to contain 12 percent propylene, 8.2 percent oxygen and 20 percent steam. The yields of acrylic acid, acetic acid and formaldehyde were 43, 8.4 and 3.3 percent respectively. The propylene conversion was 26 percent while the productivity measured 5.1 pounds acrylic acid/hour/ft.³ catalyst.

As has been suggested heretofore, the catalyst is a particulate or pelleted metal oxide used in the form of a fixed bed through which the reactant vapors are passed.

I claim:

1. In a process of oxidizing $\alpha,\beta$-unsaturated aliphatic hydrocarbons selected from the group consisting of propylene, butene-1, isobutylene, pentene-1, hexene-1, and octene-1, by means of oxygen contact with said hydrocarbon and with a fixed bed catalyst comprising oxides of cobalt and molybdenum, the improvement, prior to the introduction of hydrocarbon and during bringing the reactor up to reaction temperature, and after terminating the flow of hydrocarbon and during cooling of the reactor, of continuously passing an oxygen-containing gas through the reactor in an amount which results in an oxygen level at the reactor outlet such that after scrubbing with water the gas stream contains at least 1.5 percent oxygen.

2. The process of claim 1 in which the oxygen level during the oxidation is such that the reactor effluent contains said amount of oxygen, the hydrocarbon has three or four carbon atoms and is present in the feed to the reactor and in an amount of less than 20 percent, and the steam level in said feed is at least 15 percent.

3. The process of claim 2 in which the olefin is propylene.

4. In a process of oxidizing $\alpha,\beta$-unsaturated aliphatic hydrocarbons selected from the group consisting of propylene, butene-1, isobutylene, pentene-1, hexene-1, and octene-1, by means of oxygen contact with said hydrocarbon and with fixed bed catalyst comprising oxides of cobalt and molybdenum, the improvement of controlling the dependent variables of the amounts of the various feed stream components and the reactor effluent composition by maintaining the steam level at at least 15 percent of the feed stream, the hydrocarbon at a level of less than 20 percent of the feed stream, and the oxygen level in the feed stream at a level such that the gaseous reactor effluent, after water washing, contains at least 1.5 percent oxygen.

5. The process of claim 4 in which the olefin is propylene.

* * * * *